(12) United States Patent
Mattsson et al.

(10) Patent No.: US 12,150,207 B2
(45) Date of Patent: Nov. 19, 2024

(54) TEST MODE FOR SIM MODULE WITH AUTOMATIC TEST ENVIRONMENT DETECTION

(71) Applicant: THALES DIS FRANCE SAS, Meudon (FR)

(72) Inventors: Sebastian Mattsson, La Ciotat (FR); Jan Siba, La Ciotat (FR); Olivier Funk, La Ciotat (FR); Roberto Jr. Torrefiel, La Ciotat (FR); Juan Andrade, La Ciotat (FR); Miguel Goldstein, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 275 days.

(21) Appl. No.: 17/635,030

(22) PCT Filed: Aug. 17, 2020

(86) PCT No.: PCT/EP2020/073009
§ 371 (c)(1),
(2) Date: Feb. 14, 2022

(87) PCT Pub. No.: WO2021/032685
PCT Pub. Date: Feb. 25, 2021

(65) Prior Publication Data
US 2022/0279338 A1    Sep. 1, 2022

(30) Foreign Application Priority Data
Aug. 19, 2019 (EP) .................................... 19315094

(51) Int. Cl.
*H04W 8/18* (2009.01)
*H04M 1/24* (2006.01)
*H04W 8/20* (2009.01)

(52) U.S. Cl.
CPC ............. *H04W 8/183* (2013.01); *H04M 1/24* (2013.01); *H04W 8/205* (2013.01)

(58) Field of Classification Search
CPC ........ H04W 8/183; H04W 8/205; H04M 1/24
See application file for complete search history.

(56) References Cited

U.S. PATENT DOCUMENTS

2015/0350878 A1* 12/2015 Li ......................... H04W 8/183
                                                       455/558
2016/0295544 A1* 10/2016 Jiang ..................... H04W 12/35
(Continued)

OTHER PUBLICATIONS

International Search Report (PCT/ISA/210) and Written Opinion (PCT/ISA/237) mailed on Oct. 15, 2020, by the European Patent Office as the International Searching Authority for International Application No. PCT/EP2020/073009 (WO2021/032685)—[15 pages].

(Continued)

*Primary Examiner* — Kenneth T Lam

(57) ABSTRACT

A subscriber identity module comprising a test profile this test profile being intended to include data enabling, when the subscriber identity module is included in a device, the execution of a final quality control test on the device, the subscriber identity module further comprising a profile selector configured, when a location information provided to the subscriber identity module includes a predefined triggering information, to select the test profile.

12 Claims, 1 Drawing Sheet

(56) References Cited

U.S. PATENT DOCUMENTS

| | | | |
|---|---|---|---|
| 2021/0044947 A1* | 2/2021 | Bouskila | H04W 76/15 |
| 2021/0112401 A1* | 4/2021 | Chadwick | H04W 8/205 |
| 2022/0312292 A1* | 9/2022 | Hong | H04W 36/30 |

OTHER PUBLICATIONS

Gsm Association: 11Embedded SIM Remote Provisioning Architecture, Version 4.011—Feb. 2019 (Feb. 25, 2019), XP055677127, Retrieved from the Internet: URL:https://www.gsma.com/newsroom/wp-content/uploads//SGP.01-v4.0.pdf [retrieved on Mar. 17, 2020]p. 74-p. 75.

ETSI: "ETSI TS 102 223 v9.0.0 (Oct. 2009)—Technical Specification—Smart Cards; Card Application Toolkit (CAT) (Release 9) ". ETSI TS 102 223, European Telecommunications Standards Institute (ETSI), 650, Route Des Lucioles ; F-06921 Sophia-Antipolis; France—vol. 102 223, No. v9.0.0 Oct. 1, 2009 (Oct. 1, 2009), pp. 1-208, XP002713038, Retrieved from the Internet: URL:http://www.etsi.org/deliver/etsi_ts/10 2200 102299/102223/09.00.00 60/ts 102223v0. Retrieved from the Internet: URL: http://www.etsi.org/deliver/etsi_ts/10 2200 102299/102223/09.00.00 60/ts102223v090000p.pdf—[retrieved on Sep. 16, 2013]—paragraph [6.8.7]—paragraph [7.5.4].

* cited by examiner

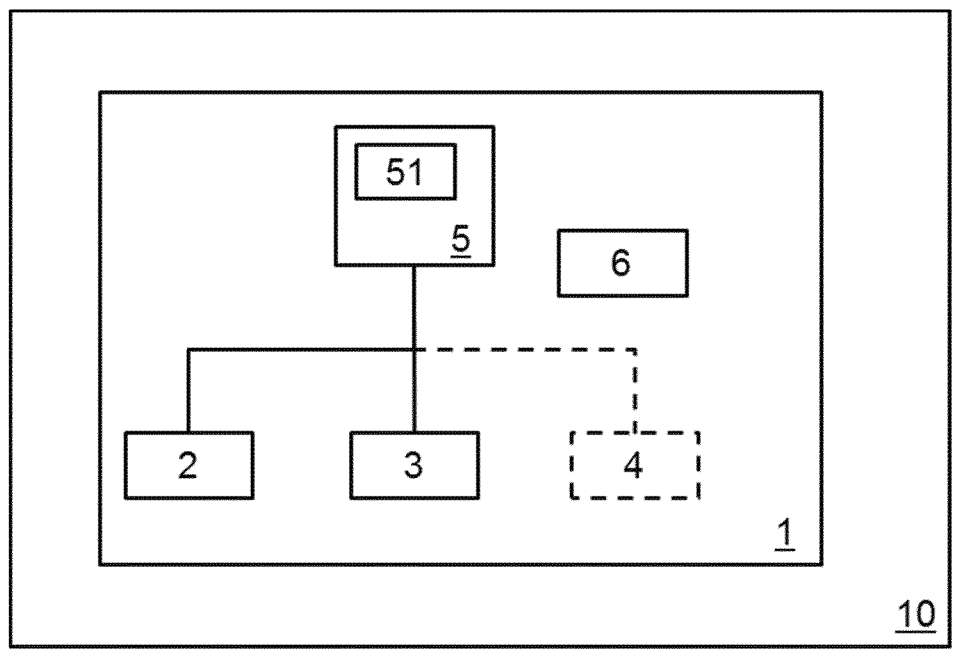

TEST MODE FOR SIM MODULE WITH AUTOMATIC TEST ENVIRONMENT DETECTION

FIELD OF THE INVENTION

The present invention pertains generally to quality control tests on devices including an embedded SIM card, and more particularly to the triggering and conduct of such quality control tests.

BACKGROUND OF THE INVENTION

A conventional method to troubleshoot or run final quality control tests on a device comprising a Subscriber Identity Module (SIM) is to use a dedicated network test equipment. In the past, removable SIM cards were plugged out from the device and replaced with a specific SIM card pre-configured for enabling the execution of final quality control tests on this device. However, when the SIM card is soldered or made hardly accessible in the hosting device, it is difficult to apply such method. Indeed, disassembling the device, unsoldering the original embedded SIM card and connecting a specific test SIM card instead requires special equipment and is a lengthy and tricky operation which deter operators from doing so.

Moreover, it is conceivable, when using a multi-profile SIM cards (eUICC), to remotely provision it with a specific test profile. Nevertheless, complex logistics and infrastructure are required to make this possible.

By final quality control tests on the device is meant here broadly and not restrictively to include any feature/task to test on the device, whether it is repetitive or not, and involving directly or indirectly the SIM card. These tests may relate to the hardware as well as to the software of the device such as correct assembly, functional testing, stress testing, connectivity parameters or network interaction performances.

One object of the present invention is to address the above-noted and other problems.

Another object of the present invention is to enable Mobile Network Operators (MNO) and/or Original Equipment Manufacturer (OEM) to perform troubleshoot or final quality control tests on a device equipped with an embedded (i.e. soldered) SIM card.

Another object of the present invention is to simplify final quality tests on devices including a eUICC (embedded Universal Integrated Circuit Card).

Another object of the present invention is to provide a simple alternative to known method for final quality control tests on devices including a eSIM card.

Another object of the present invention is to promote widespread use of embedded SIM cards.

SUMMARY OF THE INVENTION

Various embodiments are directed to addressing the effects of one or more of the problems set forth above. The following presents a simplified summary of embodiments in order to provide a basic understanding of some aspects of the various embodiments. It is not intended to identify key of critical elements or to delineate the scope of these various embodiments. Its sole purpose is to present some concepts in a simplified form as a prelude to the more detailed description that is discussed later.

Various embodiments relate to a subscriber identity module comprising a test profile, this test profile being intended to include data enabling, when the subscriber identity module is included in a device, the execution of a final quality control test on the device, the subscriber identity module further comprising a profile selector configured, when a location information provided to the subscriber identity module includes a predefined triggering information, to select the test profile.

In accordance with a broad aspect, the location information is provided to the subscriber identity module in response to a proactive command Location Status issued by the subscriber identity module.

In accordance with another broad aspect, the proactive command Location Status is comprised in an initialization procedure of the subscriber identity module.

In accordance with another broad aspect, the location information is provided to the subscriber identity module in an Envelope (Event Download-Location Status) command.

In accordance with another broad aspect, the location information is provided to the subscriber identity module to update a location information file comprised in the subscriber identity module.

In accordance with another broad aspect, the predefined triggering information comprise a mobile country code, and/or a mobile network code, and/or a location area code, and/or a cell identifier.

In accordance with another broad aspect, the profile selector is further configured, when the location information provided to the subscriber identity module do not include the predefined triggering information, to deselect the test profile.

In accordance with another broad aspect, the subscriber identity module further comprises a mobile network profile, the profile selector being further configured to select the mobile network profile.

In accordance with another broad aspect, the subscriber identity module further comprises a pointer configured to point to a selected profile by the profile selector.

In accordance with another broad aspect, the profile selector is configured to update the content of the pointer so that this pointer points to the selected profile.

In accordance with another broad aspect, the profile selector is an applet, this applet being a separate applet or totally or partially a part of an operating system of the subscriber identity module.

In accordance with another broad aspect, the subscriber identity module is an embedded Universal Integrated Circuit Card.

In accordance with another broad aspect, the subscriber identity module is a multi-subscription subscriber identity module.

Various embodiments further relate to a device including the subscriber identity module. This device is configured to provide the subscriber identity module with the location information.

While the various embodiments are susceptible to various modification and alternative forms, specific embodiments thereof have been shown by way of example in the drawing. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DESCRIPTION OF THE DRAWING

The objects, advantages and other features of the present invention will become more apparent from the following disclosure and claims. The following non-restrictive description of preferred embodiments is given for the purpose of exemplification only with reference to the accompanying sole FIG. 1, which is a block diagram illustrating a SIM module according to various embodiments.

DETAILED DESCRIPTION OF ILLUSTRATIVE EMBODIMENTS

By SIM module is meant here an application or, more generally, hardware and/or software means providing secure data storage for key data identifying a subscriber and associated subscription information. Accordingly, a SIM module may be a SIM application, a Universal SIM (USIM) application, or any equivalent subscriber identity module which may be provided on a removable SIM card (a UICC) or an embedded SIM card (eSIM or eUICC) or an integrated Sim card (iUICC). The term "embedded" (eUICC or eSIM or iUICC) means here a SIM module integrally installed in a device when it is manufactured. It is part of one or more other discrete components in the device. This device may be a mobile phone, a modem, an IoT device, or more generally a device board.

With reference to the sole FIGURE, there is shown a device 10 including a SIM module 1. This SIM module 1 comprises a test profile 2. The test profile 2 is, in one embodiment, stored in an Application Dedicated File (ADF) containing information related to this test profile (ADF USIM Test). This information may be stored in Elementary Files (EF) including, for examples, an IMSI (EF_IMSI), a USIM Service Table (EF_UST), and/or authentication data (test authentication keys).

The test profile 2 comprises a test ADF which is populated with usual test data/keys. In one embodiments, the test ADF is the one used by network simulators. Advantageously, the test profile 2 may be adapted/scaled depending on the device 10 including the SIM module 1.

The test profile 2 enables the device 10 hosting the SIM module 1 to authenticate with a predefined mobile network and run predefined final quality control tests on this device 10.

Advantageously, the test profile 2 is natively included (pre-installed) in the SIM module 1. In others words, the test profile 2 is provided by default in the SIM module 1. Accordingly, the SIM module 1 is shipped with the test profile 2.

In one embodiment, the test profile 2 is part of the operating system of the SIM module 1. Alternatively, the test profile 2 is supported by an applet or distributed between the operating system and the applet.

In an embodiment, the test profile 2 may be updated remotely through a remote control protocol (for example, OTA). In this case, a remote host sends one or more information relating to the test profile 2 to the SIM module 1. The test profile 2 may also be modified by means of an application/applet installed in the device 10 hosting the SIM module 1.

In one embodiment, the SIM module 1 further includes at least a Mobile Network operator (MNO) profile 3. More generally, the SIM module 1 may be a multi-subscription SIM module 1 comprising several mobile network operator subscriptions, each operator subscription being represented by a MNO profile 3. In one embodiment, the MNO profile 3 is a bootstrap operator profile.

The MNO profile 3 is stored in an ADF containing information related to this MNO profile (e.g. ADF_USIM MNO). This information may be stored in sub-directories or Elementary Files including, for examples, an IMSI (EF_IMSI), a USIM Service Table (EF_UST), and/or authentication data.

By including both the test profile 2 and the MNO profile 3, the SIM module 1 has a "production mode" using the MNO profile 3 and a "test mode" using the test profile 2.

In an embodiment, the SIM module 1 further comprises an ADF containing information related to IP Multimedia Services Identity Module (ADF_ISIM MNO) 4.

The SIM module 1 further comprises a Master File (MF) 5 configured to include information related to the currently selected profile. This information comprises, in one embodiment, a pointer 51 which points to the currently active/enabled profile among the available profiles 2-4 in the SIM module 1. The pointer 51 points to only one profile 2-4 at a time. This information may be stored in an application directory file (EF_DIR).

Furthermore, the SIM module 1 comprises a profile selector 6 configured to manage the selection/enabling of the test profile 2. This profile selector 6 may be further configured to select/deselect one of the available profiles 2-4 in the SIM module 1.

The profile selector 6 is, in one embodiment, an applet or, more generally, a software or firmware program configured to select and deselect (enable/disable) the test profile 2 or expose/hide it. This applet may be either a separate applet or totally or partially a part of the operating system of the SIM module 1.

In one embodiment, the selection by the profile selector 6 of the test profile 2 is based on the presence of a predefined triggering information in a location information provided to the SIM module 1. This triggering information is associated with a predefined test environment (a test network).

The triggering information may be the mobile country code (MCC), and/or the mobile network code (MNC), and/or the location area code (LAC), and/or a cell identifier of the current serving cell. In fact, as soon as the provided location information includes a predefined triggering information (such as, a MNC/MNC equal to 00101 previously associated with a test environment), the profile selector 6 selects (i.e. enables) the test profile 2.

When the location information provided by the hosting device 10 to the SIM module do not include the predefined triggering information), the profile selector 6 deselects the test profile 2 or, equivalently, selects the MNO profile 3. Accordingly, the SIM module 1 switches into/out of test mode based on the provided location information to the SIM module 1. Depending on the content of the location information with regard to a predefined triggering information, the profile selector 6 decides whether to enable or not the test profile 2.

The location information may be obtained in various ways.

For example, in one embodiment, the location information is provided by the hosting device 10 to the SIM module 1 in response to a proactive command Location Status issued by the SIM module 1 to the hosting device 10. Indeed, the profile selector 6 is configured to detect each response provided by the hosting device 10 to the SIM module 1 in response to a proactive command Location Status and to determine therefrom the location information. In one embodiment, the initialization procedure (boot up sequence)

of the SIM module 1 comprises a proactive command Location Status. The obtained response from the device 10 to this command is distributed by the operating system of the SIM module 1 to the profile selector 6 which determines therein the location information.

In another embodiment, the location information is provided by the hosting device 10 to the SIM module 1 in an Envelope (Event Download-Location Status) command. In this instance, the profile selector 6 is configured to determine the location information included in each Envelope (Event Download-Location Status) command newly received by the SIM module 1 from the hosting device 10. Such command has to be part of the current event list as requested by the SIM module 1 (via a SET UP EVENT LIST command). To that end, the profile selector 6 is registered for such an Event Download so that it can be informed by the operating system of the SIM module 1 once this event is received.

In another embodiment, the information location is retrieved by the profile selector 6 from any of the available LOCI (LOCation Information) file comprised in the SIM module 1. This LOCI file is updated by the hosting device 10. In other words, a location information is provided by the device 10 to the SIM module 1 so that updating the content of the LOCI file.

When the location information includes the predefined triggering information (for example, a predefined MCC and/or a predefined MNC, and/or a predefined LAC and/or a predefined cell identifier), the profile selector 6 enables the test profile 2. Accordingly, the profile selector 6 triggers the SIM module 1 to enter/leave the test mode based on the content of the location information provided to the SIM module 1.

Upon triggering and entering the test mode by enabling the test profile 2, the profile selector 6 writes (or overwrites) a new content into the pointer 51 so that it points to the selected profile. This pointer 51 is used by the device 10 to communicate with the currently selected profile.

When the test profile 2 is selected by the profile selector 6, the device 10 embedding the SIM module 1 connects, by using the authentication data of the test profile 2, to the network (test environment) configured for enabling the execution of final quality control tests on the device 10 and involving information included in the test profile 2.

Advantageously, the above described embodiments based on an automatic detection of the test environment bring great savings in logistics, as mobile network operators and original equipment manufacturer have no more to manage dedicated products for test purposes.

The invention claimed is:

1. A subscriber identity module embedded in a device, said subscriber identity module being an embedded Universal Integrated Circuit Card comprising a test profile, said test profile being intended to include data enabling an execution of a final quality control test on said device, wherein said subscriber identity module further comprises a profile selector configured to select said test profile, when a location information provided to said subscriber identity module includes a predefined triggering information, said profile selector being further configured, when the location information provided to said subscriber identity module do not include the predefined triggering information, to deselect said test profile.

2. The subscriber identity module of claim 1, wherein said location information is provided to said subscriber identity module in response to a proactive command Location Status issued by said subscriber identity module.

3. The subscriber identity module of claim 2, wherein said proactive command Location Status is comprised in an initialization procedure of said subscriber identity module.

4. The subscriber identity module of claim 1, wherein said location information is provided to said subscriber identity module in an Envelope (Event Download-Location Status) command.

5. The subscriber identity module of claim 1, wherein said location information is provided to said subscriber identity module to update a location information file comprised in said subscriber identity module.

6. The subscriber identity module of claim 1, wherein said predefined triggering information comprise a mobile country code, and/or a mobile network code, and/or a location area code, and/or a cell identifier.

7. The subscriber identity module of claim 1, wherein it further comprises a mobile network profile, said profile selector being further configured to select said mobile network profile.

8. The subscriber identity module of claim 1, wherein it further comprises a pointer configured to point to a selected profile by said profile selector.

9. The subscriber identity module of claim 8, wherein said profile selector is configured to update the content of said pointer so that this pointer points to the selected profile.

10. The subscriber identity module of claim 8, wherein said profile selector is an applet, this applet being a separate applet or totally or partially a part of an operating system of said subscriber identity module.

11. The subscriber identity module of claim 1, wherein said profile selector triggers the subscriber identity module to enter/leave a test mode based on content of said location information provided to the subscriber identity module.

12. The subscriber identity module of claim 8, wherein it is a multi-subscription subscriber identity module.

* * * * *